(12) United States Patent
Logvin et al.

(10) Patent No.: US 6,853,792 B2
(45) Date of Patent: Feb. 8, 2005

(54) PLANAR WAVEGUIDE STRUCTURE WITH SEGMENTED TRENCHES AND CLOSELY SPACED, OPTICALLY ISOLATED WAVEGUIDES

(75) Inventors: Yury Logvin, Ottawa (CA); Adrian O'Donnell, Ottawa (CA)

(73) Assignee: Metrophotonics Inc., Ottawa (CA)

( * ) Notice: Subject to any disclaimer, the term of this patent is extended or adjusted under 35 U.S.C. 154(b) by 81 days.

(21) Appl. No.: 10/439,234

(22) Filed: May 16, 2003

(65) Prior Publication Data

US 2004/0228570 A1 Nov. 18, 2004

(51) Int. Cl.⁷ .................................................. G02B 6/10
(52) U.S. Cl. ............................ 385/129; 385/14; 385/15; 385/16
(58) Field of Search ...................... 385/14–16, 129–132

(56) References Cited

U.S. PATENT DOCUMENTS 6,177,333 B1    1/2001  Rhodes
6,403,393 B1  *  6/2002  Adkisson et al. ........ 385/129 X
6,556,759 B2  *  4/2003  Roberts et al. ............. 385/132

* cited by examiner

Primary Examiner—Phan T. H. Palmer
(74) Attorney, Agent, or Firm—Freedman & Associates (57) ABSTRACT

A design for controlling optical modes in a closely spaced weakly confined waveguide array is described wherein the crosstalk between individual waveguides is suppressed by segmented deep etched trenches. One exemplary embodiment of the invention incorporates a shallow etched ridge waveguide array at the output coupler of a semiconductor optical demultiplexer. In this situation, all higher order modes and supermodes are filtered by a sequence of deep etched trenches located between the shallow etched ridge waveguides. The trenches have a minimal effect on the single fundamental mode of the individual shallow etched waveguides because the trenches are located far enough from the ridge waveguides where an evanescent tail of the fundamental mode approaches a minimal power level. The trenches affect and suppress all other modes including higher order leaky modes and array supermodes leaving the single fundamental mode propagating in the arrayed waveguides.

29 Claims, 6 Drawing Sheets

(Prior Art)

PLANAR WAVEGUIDE STRUCTURE WITH SEGMENTED TRENCHES AND CLOSELY SPACED, OPTICALLY ISOLATED WAVEGUIDES

FIELD OF THE INVENTION

This invention relates to integrated waveguide devices used in optical communications that are produced from planar waveguide substrates and more particularly to the design of waveguide devices to control and manage optical coupling and crosstalk in such devices with arrays of closely spaced, and weakly confined optical waveguides.

BACKGROUND OF THE INVENTION

Optical components are extensively used in data communication networks. Typically these components are designed to manipulate light having a single mode. In order to increase the rate of information transfer associated with an individual optical waveguide it is known to multiplex optical signals with different, predetermined wavelengths. When many different wavelengths are multiplexed on a waveguide it is increasingly common, from a viewpoint driven by cost, space, power etc. to employ planar integrated circuit solutions to manipulate, combine or separate the individual optical signals rather than assemblies of discrete or hybrid natures. Even then, there are continued benefits from reducing the die footprint of the monolithic solution, such as reduced die costs, smaller packages, lower electrical power for thermal stabilization etc. It is commonly known to separate a wavelength multiplexed optical signal into a plurality of optical signals, each having a characteristic wavelength range. This application is ideally suited to integrated wavelength demultiplexers. Examples of such devices include echelle gratings and arrayed waveguide gratings, AWG for short. These devices are designed to support a single mode of light and typically, anything from a relatively small number of wavelength channels, typically four wavelength channels, through to complete high capacity long-haul systems with 80 wavelength channels. But, irrespective of the chosen material system, which can include for example silica glass, polymer, indium phosphide, gallium arsenide, and silicon, the guiding of the single mode of light is that of a weakly confined mode within the waveguide of such integrated optical waveguide devices.

Additionally, these devices incorporate a wavelength dispersive element that causes a wavelength multiplexed optical signal coupled to an input port of the device to separate into the individual optical signals corresponding to predetermined wavelength channels. Each of these individual optical signals is coupled to a specific output waveguide. Given the previous statements that minimizing the die dimensions is beneficial itself, even above and beyond simply migrating to a planar platform, the design of the wavelength dispersive element is therefore similarly driven to minimum dimensions as this is generally the dominant element of the overall monolithic circuit. Consequently, it is generally the case that the individual waveguides corresponding to these different waveguide channels are closely spaced and approximately parallel. Furthermore, subsequent elements operating in arrayed form on the discrete wavelengths benefit from similar closely spaced waveguides to minimize die footprint. Unfortunately, when optical waveguides, especially with weakly confined modes, remain closely spaced over a sufficiently long distance then the optical signals that propagate therein couple between adjacent waveguides and will therefore act essentially as a source of crosstalk. The amount of crosstalk being a function of the separation of the waveguides, the distance along which the waveguides are approximately parallel and the optical confinement of the waveguides for a given wavelength of the optical signal. Furthermore, the arrayed nature of the designs can result in said mode coupling in some degree from say a first channel to the second, but now this second channel is coupled to both first and third channels. This can result in optical crosstalk occurring across multiple waveguides from the originating source and works similarly across the entire array.

Additionally, when the wavelength multiplexed optical signal is dispersed in dependence upon wavelength, the optical signals provided often include optical modes other than the desired lowest order single mode in the receipt waveguides from the dispersive element. This is a result of adjusting the modal behaviour of the receipt waveguide so that the overall overlap of the structure generates a substantially flatter passband which is desirable in filtering elements separating optical channels. Since the waveguides are weakly confined, these higher order modes can continue propagating along the waveguides as the structure is tapered back towards a singlemode structure. Worse still, these higher order modes are positioned such that more of their energy is positioned further away from the waveguide center than the desired single mode and therefore such modes are more likely to couple to adjacent channels and cause crosstalk.

It is obvious to one trained in the art that if the waveguides on the substrate are made at a substantially non-zero angle to each other, making the waveguides sufficiently separated over relatively short distances, that cross talk between them becomes negligible. While this solution does reduce the undesired crosstalk it also results in significantly larger dimensions of the device, and in some material systems causes manufacturing issues with off-axis etching of materials. Increasing the chip size reduces the number of chips that are normally provided by a wafer thereby increasing costs of the finished device significantly.

Clearly, it would be beneficial to have a design for an integrated waveguide structure that incorporates an array of closely spaced parallel single mode waveguides, each of the waveguides for propagating an optical signal and each of the optical signals substantially confined to a region proximate to the waveguide core, thereby preventing crosstalk. Additionally, it would be beneficial if such a waveguide structure were produced using well-established, cost effective processes.

SUMMARY OF THE INVENTION

The invention teaches a waveguide structure comprising:

a first waveguide for weakly confining a first optical signal propagating therein, said first waveguide having an optical propagation axis and a characteristic length as measured along said optical propagation axis, said first waveguide disposed on a substrate;

a second waveguide for weakly confining a second optical signal propagating therein, said second waveguide disposed in close proximity to said first waveguide, said second waveguide disposed on a same substrate;

a trench formed within said substrate between said first waveguide and said second waveguide, said trench having a characteristic length as measured parallel to said optical propagation axis of the first waveguide, said characteristic length of the trench being substantially shorter than said characteristic length of the first waveguide, said trench having a material having a low index of refraction therein.

Further, the invention provides a method of filtering higher order modes of an optical signal propagating within a waveguide comprising:

receiving an optical signal at a first input port;

propagating said optical signal from said input port along a first portion of a first waveguide, coupling a first fraction of the optical signal corresponding to a higher order mode in a first trench, the first trench disposed proximate said first portion, the first trench disposed sufficiently distant the first portion to inhibit the coupling of a lowest order single mode of the optical signal with the first trench;

coupling the optical signal from the first portion to a second portion of the waveguide;

propagating said optical signal along the second portion such that a small fraction of the optical energy of the optical signal is transferred to higher order modes;

coupling the optical signal from the second portion to a third portion of the waveguide; and, propagating said optical signal along the third portion, coupling a second fraction of the optical signal corresponding to a higher order mode in a second trench, the second trench disposed proximate said thrid portion, the second trench disposed sufficiently distant the third portion to inhibit the coupling of a lowest order single mode of the optical signal with the second trench.

BRIEF DESCRIPTION OF THE DRAWINGS

The invention is now described with respect to the figures in which.

DETAILED DESCRIPTION OF THE INVENTION

Figure 1:
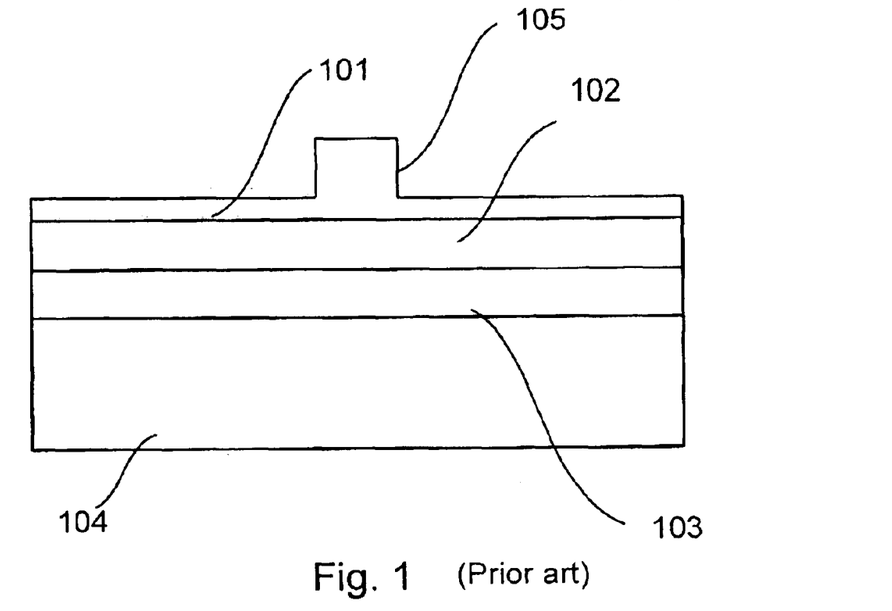
FIG. 1 is a cross section view of a prior art ridge waveguide structure.

Referring to FIG. 1, a cross section view of a prior art ridge waveguide structure 100 is shown. The waveguide structure 100 includes an etched upper cladding layer 101, a core layer, 102, a lower cladding layer 103 and a substrate layer 104. Ridges 105 have been provided using a shallow etching process, selectively etching the upper cladding layer 101 to generate a localized refractive index increase that forms the waveguide confinement of the optical signal, within core layer 102. These waveguides provide weak confinement to optical signals propagating therein.

Figure 1A:
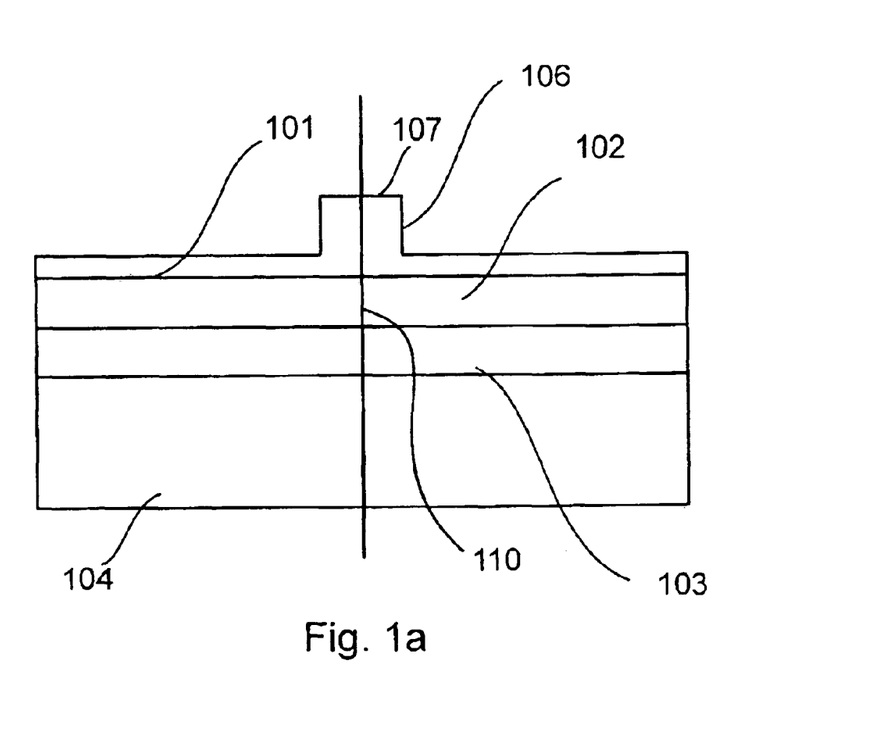
FIG. 1a is an intensity distribution of an optical signal propagating within a waveguide according to FIG. 1.

Referring to FIG. 1a, the same waveguide structure as FIG. 1 is shown, together with a vertical axis 110 is shown. As is well understood by a person of skill in the art, an intensity of an optical signal propagating within the waveguide structure will be symmetric about a vertical axis 110 that bisects the plateau 107. Additionally, a maximum intensity will be proximate the vertical axis 110 and the intensity of the optical signal will be reduced in a continuous manner further from the ridges 105.

Figure 2:
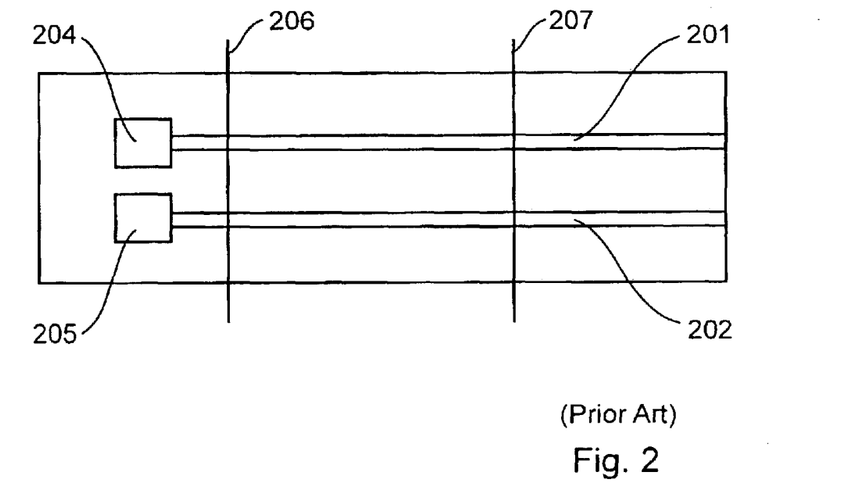
FIG. 2 is a top view of a typical pair of waveguide structures according to the prior art.
Figure 3A:
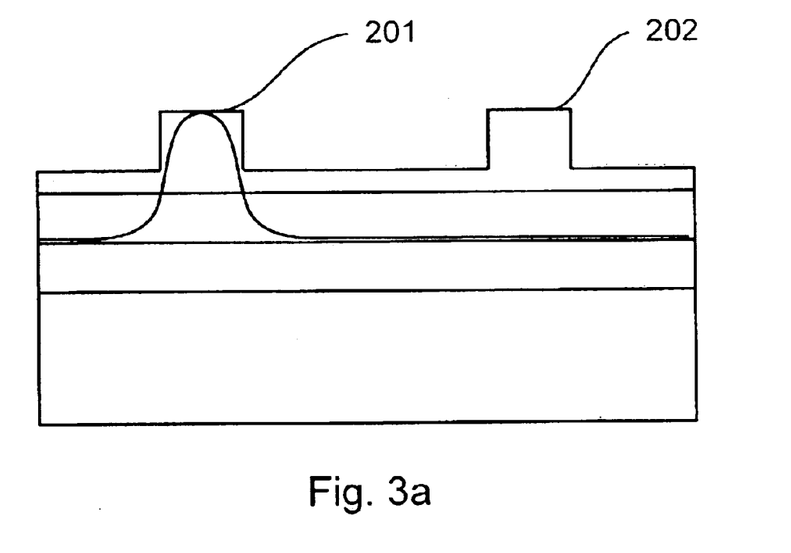
FIG. 3a is an intensity profile of light superimposed on FIG. 2 at a first location in which an optical signal is present in a first waveguide and the second waveguide has almost no light propagating therein.
Figure 3B:
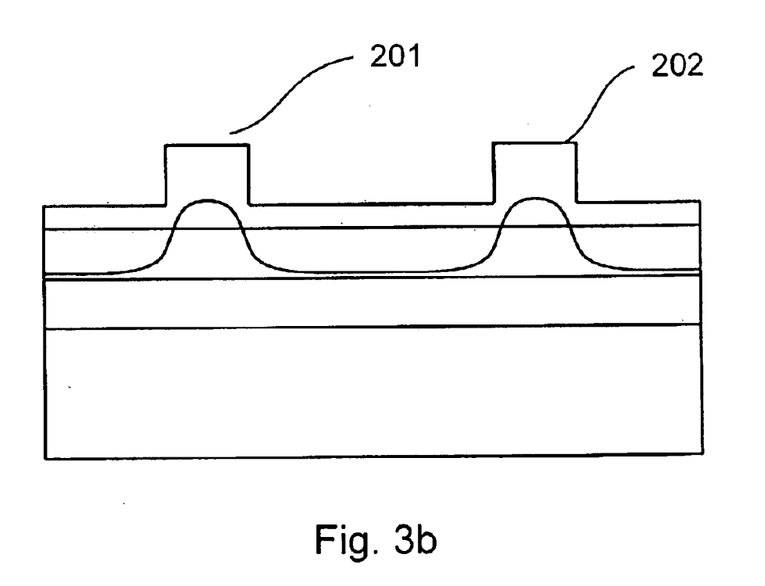
FIG. 3b is an intensity profile of the waveguide substrate of FIG. 2 at a second location in which both waveguides have light propagating therein.

Referring to FIG. 2 a pair of closely spaced ridge waveguides 201 and 202 are shown on a same waveguide substrate according to the prior art. The substrate includes a pair of light sources 204 and 205 that are shown at the end of the ridge waveguides 201 and 202 respectively. Light provided by light source 204 is coupled to ridge waveguide 201 and light provided by light source 205 is coupled to ridge waveguide 202. This figure shows a first section line 206 and a second section line 207. Referring now to FIG. 3a, an intensity of light distribution is shown superimposed on the section view corresponding to the first section view line 206 of FIG. 2. In this case, light source 204 is providing light and light source 205 is not providing light. Ideally, there would no optical energy in the ridge waveguide absent an operating light source however; a very small fraction of light is present in the region corresponding to ridge waveguide 202 as a result of light propagating within waveguide 201. As the light continues propagating along the weakly confined ridge waveguide 201, energy is transferred to ridge waveguide 202. Referring to FIG. 3b an intensity profile of light corresponding to section line 207 is shown. In this location, the light intensity is approximately equal for the two waveguides. The light will continue transferring energy between the waveguides at is propagates. This behaviour is well understood by those skilled in the art.

Although this example features only two parallel waveguides other designs will optionally feature many more. When more waveguides are present optical signals are able to transfer energy between a larger number of waveguides and therefore this problem is compounded and more complicated. Considering FIG. 3b if there was an adjacent waveguide to the right of 202 then as light coupled into it from 201 some power would start coupling into the third waveguide.

Figure 4:
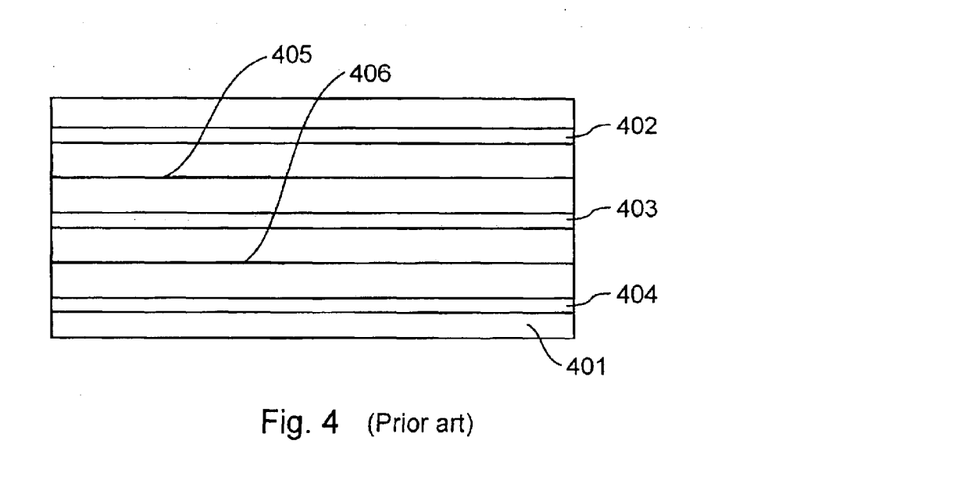
FIG. 4 is a top view of a typical pair of waveguide structures according to prior art wherein continuous trenches are added to separate the waveguide ridges.
Figure 4A:
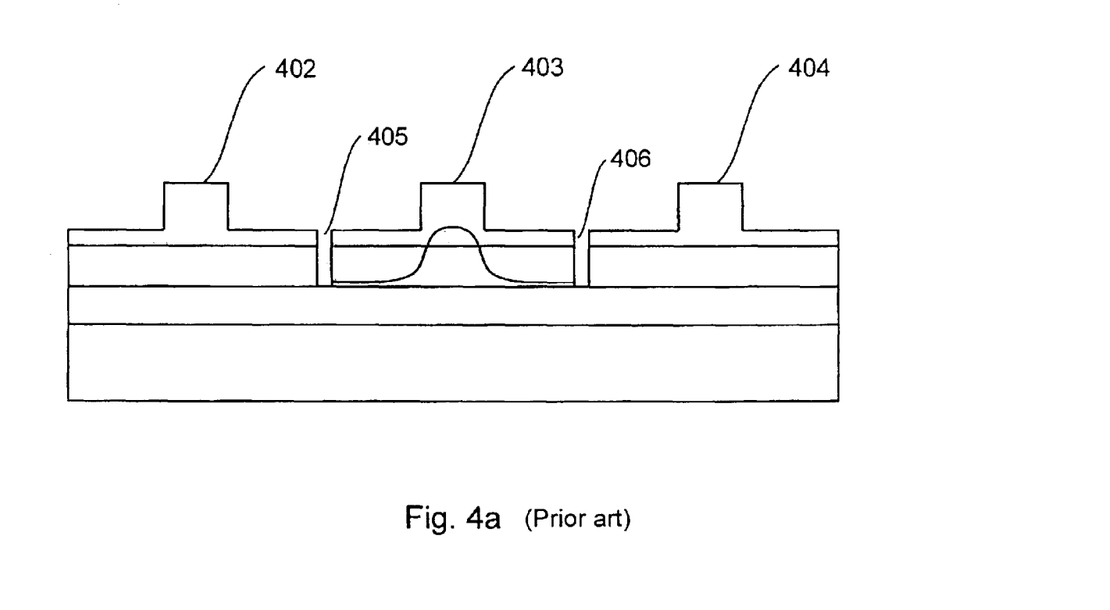
FIG. 4a is an optical intensity profile of light superimposed on a cross-section view of the waveguide structure of FIG. 4.

Referring to FIG. 4, a top view of waveguide structure 401 according to the prior art is shown. The waveguide structure 401 has ridge waveguides 402, 403 and 404, and continuous trenches 405 and 406. The continuous trenches 405 and 406 reduce optical energy transfer between the ridge waveguides 402, 403 and 404. In this case, the trenches 405 and 406 have been produced by a step of deep etching. This process is well established with regards to producing other waveguide structures, such as gratings facets. When the device is packaged, the trenches are full of air. The depth of the trenches is depicted in FIG. 4a i.e., the etching goes through the upper cladding layer, and penetrates the core layer. Other similar embodiments feature trenches having different depths. In some cases the trenches penetrate into the lower cladding. Referring to FIG. 4a, an intensity profile of light corresponding to an optical signal propagating within a waveguide structure according to FIG. 4 is shown. In this case, light has been coupled to the waveguide 403 but not waveguides 402 and 404 as is evident from the intensity profile. Since the trenches act to inhibit coupling between the adjacent parallel waveguides, there is almost no crosstalk. The figure clearly shows that the optical energy is prevented from propagating between the waveguides. Clearly, the depth of the trenches is optionally increased without compromising the improved crosstalk performance of the device, however reducing the depth of the trenches is likely to have an adverse effect on crosstalk. Although the trenches 405 and 406 in this embodiment have air present within them, this need not be the case. It is recommended that the trenches be filled with a material having a lower index of refraction than the cladding layers. This waveguide structure is for use with short waveguides that require good optical isolation. In the event that the waveguides are long a device according to this design will also have long trenches. One significant drawback of this approach is that the modal solution for the rib loaded waveguide which is now bounded laterally by two high index discontinuities has very different solutions to the original rib waveguide. This has two effects, first the modal differences for the fundamental single mode result in an insertion loss penalty on every transition. Secondly, the structure is now highly multimoded with so-called supermmodes of the overall air-bounded structure. These reduce as the trenches 405 and 406 are laterally spaced further away from the rib waveguide 403. However, this is the exact opposite of the solution that a person of skill in the art would seek, namely a reduction in crosstalk as we bring the optical waveguides closer together. This also has the unfortunate effect that scattering of light in the rib waveguides, the dominant loss mechanism, results in the excitation of these higher order modes within the waveguide. Thus, while this structure is useful there are many applications for which it is not well suited, particularly where waveguides are very closely spaced and sensitive to launch conditions, the very heart of wavelength demultiplexers. Here the supermodes would be excited and hence wavelengths which would not normally couple to the channel waveguide do so resulting in increased crosstalk in the demultiplexer itself.

Figure 5:
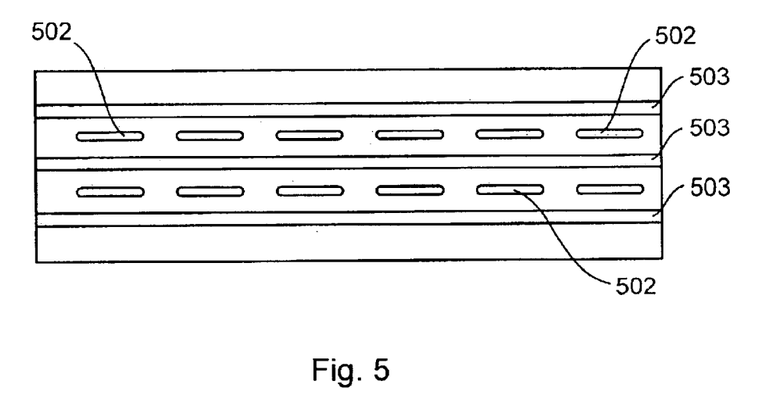
FIG. 5 is top view of a pair of waveguide structures according to an embodiment of the invention.

Referring to FIG. 5, a waveguide structure 501 according to an embodiment of the invention is shown. The planar waveguide structure 501 features a plurality of waveguides 503. Now, however the waveguides are interspersed with segmented trenches 502. This design is particularly well suited for providing a design for an array of waveguides that receive diffracted optical signals such as the output waveguides of an arrayed waveguide grating. In this application, it is known that the optical signals provided to the waveguides are frequently multi-mode. Although only the lowest order mode is desired, there is some energy launched into the other supermodes as well, as outlined previously. The trenches 502 are positioned such that they do not substantially interfere with the propagation of the desired lowest order mode however they do affect the higher order modes, and also disrupt the coupling between adjacent waveguides as there is no continuous modal solution along the length of the structure to support cross-coupling. As can be seen the trenches 502 are disposed between the waveguides 503. The position and geometry of the trenches 502 are to be chosen based upon a number of design objectives. The length of the trench 502 should be sufficient that the light "coupled" into a trench propagates out of the substrate. Additionally, the length of the gap between two successive trenches 502 should allow the higher order modes to redistribute their energy in a transverse direction so that these modes interact with the next trench 502. Third, the separation between the edge of the trench proximate the waveguide and the ridge of the waveguide should be large enough in order not to significantly affect the fundamental mode of the waveguide. When these design criteria are carefully followed by a person of skill in the art of waveguide optics and design, the presence of the trenches 502 inhibits multi-mode propagation of the optical signal. Again, the trenches 502 are produced using a deep etching technique however this does not suggest that other methods for producing the trenches should not be considered. The overall effect is to eliminate inter-channel crosstalk and to suppress intra-channel crosstalk from incorrect propagation of higher order modes. It will be apparent to one skilled in the art that these design criteria are useable with waveguide structures other than the waveguide structure of FIG. 5. Specifically, FIG. 5 shows the waveguides 503 as being parallel. It is commonly the case that a set of waveguides will be disposed in close proximity to each other with a small angle, typically less than 6°, between the various waveguides. Such a configuration is often provided for receiving wavelength-dispersed light from, for example, an optical grating. The etching processes available to waveguide designer permit disposing a trench between closely spaced waveguides in which the waveguides are less than 20 $\mu$m apart.

Figure 6:
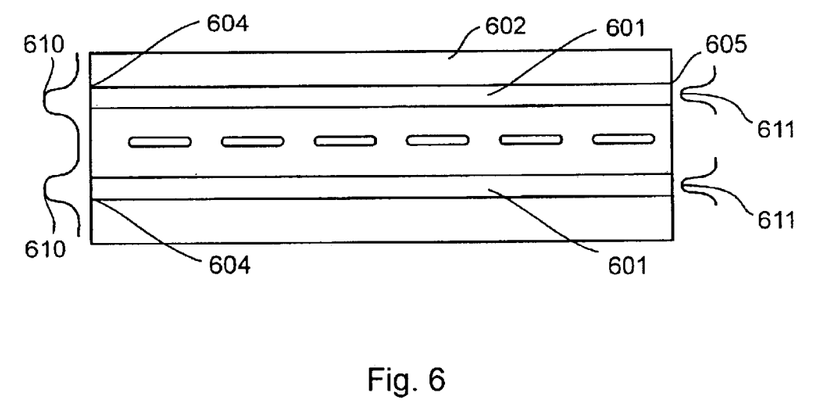
FIG. 6 is a top view of a pair of waveguide structures according to an embodiment of the invention including an input intensity profile and an output intensity profile.

Referring to FIG. 6, a set of parallel waveguides 601 is shown disposed on a substrate 602. A set of trenches 603 is disposed between the waveguides 601 according to the invention. Each of the waveguides 601 has an input port 604 and an output port 605. The intensity distribution includes a series of peaks 610, each of the peaks 610 provided at a location proximate the center of a corresponding input port 604. Clearly, the intensity distribution of light incident the parallel waveguides indicates that there is a small amount of light that is not coupled into the input ports 604. This light has the detrimental effect of exciting modes other than the desired signal mode. This type of profile is typical of light received from an echelle grating or light incident the output ports of the output slab of an arrayed waveguide grating. The parallel waveguides structure with discontinuous trenches according to the invention beneficially dissipates these higher order modes. Clearly, the distance separating the trenches 603 from the waveguide cores 601 should be carefully chosen to ensure that the fundamental single-mode of the waveguide 601 is acceptably small at the location of the trench 603. Thus, the corresponding intensity profile of light at the output ports features peaks 611 near the center of the waveguide 601, some light provided from the cladding proximate the waveguide 601 and almost not light further into the cladding.

Figure 7:
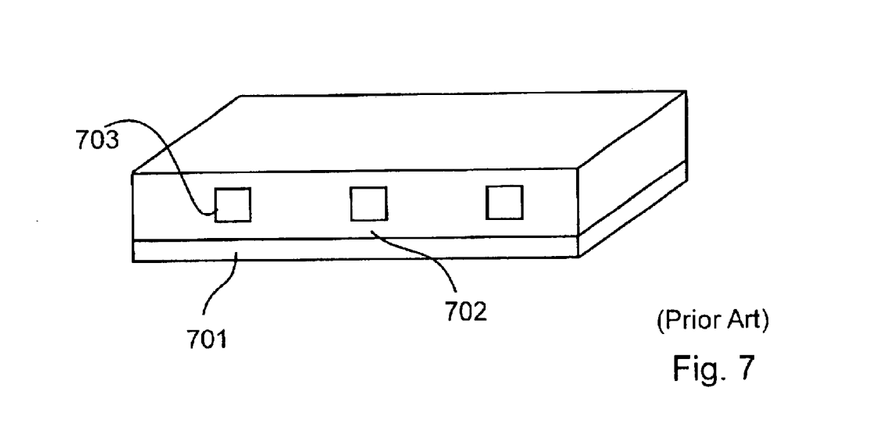
FIG. 7 is an isometric view of a prior art embodiment of an array of waveguides, in this case buried waveguide structures; and, FIG. 8 is a isometric view of a buried waveguide array structure according to the invention.

Referring to FIG. 7, an isometric view of a prior art buried waveguide is shown. The waveguide structure includes a substrate 701, a cladding layer 702, and a high index waveguide core 703. Since the waveguide core layer is not planar, ridges are not needed for providing the waveguides. This waveguide structure has been designed to propagate optical signals having a single mode. A person of skill in the art will be aware that this waveguide structure is prone to optical cross talk when the waveguide cores 703 are disposed in close proximity to one another. The amount of crosstalk will be dependant upon the length in which the waveguides are sufficiently close to exchange energy. This is very much analogous to crosstalk in the prior art ridge waveguide structure as described hereinbefore with reference to FIG. 2, FIG. 3 and FIG. 3a.

Figure 8:
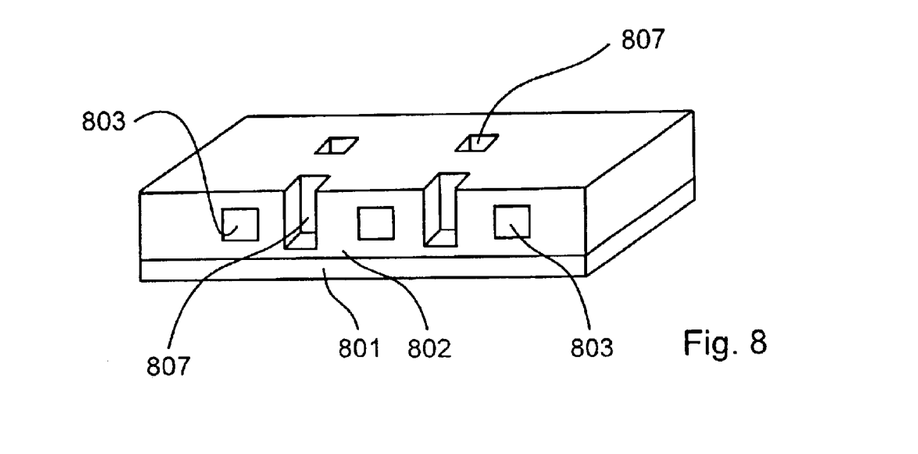

Referring to FIG. 8, an isometric view of a buried waveguide structure according to the invention is shown. This structure includes a substrate 801, a lower cladding layer 802, waveguide core 803, and trenches 807. This structure is designed to propagate single mode optical signals proximate the waveguide cores 803. The trenches 807 optically isolate the individual waveguide cores 803 and thereby inhibit optical crosstalk. The trenches 807 also filter unwanted higher order modes propagating proximate the waveguide cores 803. The trenches 807 are disposed such that they do not substantially interfere with the propagation of the desired single mode but will interfere with other higher order modes. The trenches are sufficiently long to dissipate these higher order modes when the trenches are filled with material having a sufficiently low index of refraction. Additionally, the distance between the trenches along the optical axis of the waveguide cores 803 is sufficiently long that a portion of the energy of a higher order mode propagating proximate the waveguide core will be incident on the trench. Clearly, a variety of techniques exist for forming the waveguide structure of FIG. 8. Additionally, the geometry of the waveguide cores varies with different designs and production processes.

It should be noted that the trenches described with respect to the invention are optionally sufficiently deep that they penetrate the optical substrate. Clearly, since the trenches described with reference to embodiments of the invention are not continuous the substrate need not be severed into two pieces when such a penetrating trench is used. Therefore, the use of the word "trench" with respect to embodiments of the invention should be understood to include features that optionally penetrate the device.

Numerous other embodiments of the invention may be envisioned by a person of skill in the art of waveguide design without departing from the spirit or scope of the invention.

What is claimed is:

1. A waveguide structure comprising:
   a first waveguide for weakly confining a first optical signal propagating therein, said first waveguide having an optical propagation axis and a characteristic length as measured along said optical propagation axis,
   said first waveguide disposed on a substrate;
   a second waveguide for weakly confining a second optical signal propagating therein, said second waveguide disposed in close proximity to said first waveguide,
   said second waveguide disposed on a same substrate;
   a trench formed within said substrate between said first waveguide and said second waveguide, said trench having a characteristic length as measured parallel to said optical propagation axis of the first waveguide, said characteristic length of the trench being substantially shorter than said characteristic length of the first waveguide,
   said trench having a material having a low index of refraction therein.

2. A waveguide structure according to claim 1, comprising:
   a plurality of trenches formed within said substrate between said first waveguide and said second waveguide, each trench of said plurality of trenches having a characteristic length as measured parallel to said optical propagation axis of the first waveguide, each of said characteristic lengths of the trenches being substantially shorter than said characteristic length of the first waveguide,
   each of said trenches of the plurality of trenches having a material having a low index of refraction therein.

3. A waveguide structure according to claim 2, wherein the trenches are disposed such that no more than one trench is intersected by a line perpendicular to the first waveguide and connecting a point along the first waveguide with a point along the second waveguide.

4. A waveguide structure according to claim 3, wherein each trench of the plurality of trenches has a wall disposed substantially parallel to said first waveguide.

5. A waveguide structure according to claim 4, wherein each of the plurality of trenches has an approximately same characteristic length.

6. A waveguide structure according to claim 5, wherein each of the plurality of trenches is disposed with a same predetermined distance between trenches.

7. A waveguide structure according to claim 1, comprising:
   a second trench formed within said substrate between said first waveguide and said second waveguide, said second trench having a second characteristic length as measured parallel to said optical propagation axis of the first waveguide, said characteristic length of the trench being substantially shorter than said characteristic length of the first waveguide,
   said second trench having a material having a low index of refraction therein.

8. A waveguide structure according to claim 7, wherein the first trench and the second trench are co-linear.

9. A waveguide structure according to claim 8, wherein a portion of a wall of the first trench proximate the first waveguide is parallel to the first waveguide and a portion of a wall of the second trench is parallel to the second waveguide.

10. A waveguide structure according to claim 9, wherein an angle formed between a tangent to an optical axis of the first waveguide at the first trench and a tangent to an optical axis of the second waveguide at the first trench is less than 6°.

11. A waveguide structure according to claim 1, wherein the substrate is a semiconductor material.

12. A waveguide structure according to claim 11, wherein the semi-conductor material is Indium Phosphide.

13. A waveguide structure according to claim 11, wherein the semi-conductor material is Gallium Arsenide.

14. A waveguide structure according to claim 1, wherein the trench has a first wall proximate the first waveguide and the first wall is parallel to the optical propagation axis of the first waveguide proximate the trench.

15. A waveguide structure according to claim 14, wherein the trench has a second wall proximate the second waveguide and the second wall is parallel to an optical propagation axis the second waveguide proximate the trench.

16. A waveguide structure according to claim 1, wherein the distance between the first and second waveguides is less than 20 $\mu$m.

17. A waveguide structure according to claim 1, wherein the geometry and optical properties of said trench are sufficient for inhibiting energy transfer to an optical supermode in a region of the waveguide structure proximate both the first waveguide and the second waveguide when either of the first optical signal and the second optical signal is provided to the respective waveguide.

18. A waveguide structure according to claim 1, wherein the first waveguide is for weakly confining a single-mode optical signal and wherein the second waveguide is for weakly confining another single-mode optical signal.

19. A waveguide structure according to claim 1, wherein the trench is formed in a deep etching process.

20. A method of filtering higher order modes of an optical signal propagating within a waveguide comprising:

receiving an optical signal at a first input port;

propagating said optical signal from said input port along a first portion of a first waveguide, coupling a first fraction of the optical signal corresponding to a higher order mode in a first trench, the first trench disposed proximate said first portion, the first trench disposed sufficiently distant the first portion to inhibit the coupling of a lowest order single mode of the optical signal with the first trench;

coupling the optical signal from the first portion to a second portion of the waveguide;

propagating said optical signal along the second portion such that a small fraction of the optical energy of the optical signal is transferred to higher order modes;

coupling the optical signal from the second portion to a third portion of the waveguide; and, propagating said optical signal along the third portion, coupling a second fraction of the optical signal corresponding to a higher order mode in a second trench, the second trench disposed proximate said thrid portion, the second trench disposed sufficiently distant the third portion to inhibit the coupling of a lowest order single mode of the optical signal with the second trench.

21. A method of filtering higher order modes of an optical signal propagating within a waveguide according to claim 20, wherein the first and second waveguides are disposed on a same substrate and wherein the substrate is a semiconductor material.

22. A method of filtering higher order modes of an optical signal propagating within a waveguide according to claim 21, wherein the semi-conductor material is Gallium Arsenide.

23. A method of filtering higher order modes of an optical signal propagating within a waveguide according to claim 21, wherein the semi-conductor material is Indium Phosphide.

24. A waveguide structure according to claim 20, wherein the first trench and the second trench are co-linear.

25. A waveguide structure according to claim 24, wherein a wall of the first trench is disposed parallel to the first portion and a wall of the second trench is disposed parallel to the third portion.

26. A method of filtering higher order modes of an optical signal propagating within a waveguide according to claim 20, wherein the first trench and the second trench are formed using a deep etching process.

27. A method of filtering higher order modes of an optical signal propagating within a waveguide according to claim 20, wherein the first trench and the second trench comprise low refractive index material.

28. A method of filtering higher order modes of an optical signal propagating within a waveguide according to claim 20, comprising:

propagating a second optical signal along a second waveguide, the second waveguide disposed in close proximity to said first portion such that said first trench is disposed between the second waveguide and the first waveguide and wherein distance between the first waveguide and the second waveguide is less than 20 $\mu$m.

29. A method of filtering higher order modes of an optical signal propagating within a waveguide according to claim 20, wherein the first waveguide is weakly confining.

* * * * *